(12) United States Patent
Chuang

(10) Patent No.: US 7,427,087 B2
(45) Date of Patent: Sep. 23, 2008

(54) HIDDEN FASTENING STRUCTURE

(75) Inventor: Cheng-Hsiang Chuang, Taipei (TW)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 11/669,071

(22) Filed: Jan. 30, 2007

(65) Prior Publication Data

US 2008/0179894 A1 Jul. 31, 2008

(51) Int. Cl.
*E05C 19/10* (2006.01)
(52) U.S. Cl. .................. 292/98; 292/DIG. 37; 361/683
(58) Field of Classification Search .......... 292/DIG. 37, 292/124, 98, 222, 224, 197; 361/683
See application file for complete search history.

(56) References Cited

U.S. PATENT DOCUMENTS 4,249,760 A * 2/1981 Conley ........................ 292/197
5,580,107 A 12/1996 Howell
5,676,408 A * 10/1997 Davidian ..................... 292/197
6,563,699 B1 * 5/2003 Choi ............................ 361/683
6,827,376 B2 * 12/2004 Fountaine ..................... 292/98
6,870,740 B2 3/2005 Hsu et al.
6,965,512 B2 11/2005 Huang et al.
2003/0223190 A1 * 12/2003 Hashimoto ................... 361/683

* cited by examiner

*Primary Examiner*—Gary Estremsky
(74) *Attorney, Agent, or Firm*—Workman Nydegger

(57) ABSTRACT

A hidden fastening structure applied to an electronic device is provided, which comprises a actuator and a fastener controlled by the actuator, wherein the fastener is rotatably disposed on the electronic device. When the actuator is pushed by external forces in the horizontal direction, the fastener is driven to rotate about the electronic device, thereby providing a hidden position accommodated within the electronic device or a fastening position outside the electronic device.

17 Claims, 5 Drawing Sheets

HIDDEN FASTENING STRUCTURE

BACKGROUND OF THE INVENTION

1. Field of Invention

The present invention relates to a fastening structure, and more particularly, to a hidden fastening structure suitable for electronic devices that can be covered.

2. Related Art

The configuration of a conventional notebook computer is generally divided into two parts: a base and a screen which can be connected to the base via a rotating shaft mechanism. When the notebook is used, the screen is opened from the base. When the screen is closed, a fastener is mounted on the base, so as to fix the screen to the base when the notebook is put away or carried along; otherwise, the screen opens, resulting in scratching of the surface of the screen, dust entering into the gaps of the keyboard, or damage to the rotating shaft mechanism.

However, a notebook-like computer has a liquid crystal screen that can be converted from a notebook mode to a tablet mode, i.e., the liquid crystal screen is turned backwards, such that the panel faces outwards and then is drawn close to the keyboard to be closely combined with the keyboard. As such, a liquid crystal display is obtained, i.e., a tablet PC. A locking element is usually disposed at a position where the screen covers the base, so as to prevent the liquid crystal screen from being opened freely. Moreover, the locking element also can be used for locking and positioning when the liquid crystal screen is rotated to be folded into a briefing mode for writing and reading.

U.S. Patent Publication U.S. Pat. No. 5,580,107 provides a hidden fastening mechanism, which comprises an extending arm and a winding rope with one end connected to a pivot joint within the screen, and the other end of the winding rope is connected to the extending arm extended from the fastener. Under external forces, the extending arm drives the winding rope, and the winding rope further drives the fastener, such that the fastener is selectively hidden in the screen or exposed from the screen. However, the assembly manner is not practical and the winding rope requires a large space, and thus, it cannot be used in a narrow frame space.

U.S. Patent Publication U.S. Pat. No. 6,870,740 provides a-two-way fastening device, wherein both surfaces of the cover overlay and fastened on the base. When external forces are applied to an actuator, the actuator has four statuses of moving positions, such that a fastener is driven to protrude from the base to be fastened or to be released and dropped out from the base, and thus, a restorer drives the fastener and the actuator to return to the initial status.

U.S. Patent Publication U.S. Pat. No. 6,965,512 provides a mechanism system with a movable hook, wherein the hook is released from the fixing device when being rotated to be hidden within the lower body, and it is combined with the fixing device when being rotated to be exposed from the lower body, such that the upper body and the lower body are fixedly closed. Moreover, the fastening device includes a handle, a tension spring, and an actuator. The fastening device is used to push the tension spring and further push the handle and the fastener, such that the hook rotates relative to the lower body. However, there are too many parts, and the assembling process is difficult.

U.S. Patent Publication US 20050180562 provides a hidden hook driving structure, wherein a connecting lever is driven by pressing a key, and the connecting lever is pivotally connected to a magnetic hook, such that the hook is snapped due to being attracted by the magnetic pieces of the body.

SUMMARY OF THE INVENTION

In view of the above disclosed prior arts, a large number of parts are required and the assembling process is difficult, and the assembly method cannot be applied to products in practice. Besides, a large space is demanded, such that it cannot be used in a narrow body. Furthermore, the operating process of the fastener is complicated. Therefore, the present invention provides a hidden fastening structure, wherein the fastening effect in the rotating direction is achieved when being applied with forces in the horizontal direction.

The hidden fastening structure disclosed by the present invention is applied to electronic devices, which comprises an actuator and a fastener, wherein the actuator is movably disposed on an electronic device and further comprises an activation button and a guide piece with a guiding slot. Under an external force, the activation button drives the guide piece, such that they together move to a first position and a second position. Further, the fastener is rotatably disposed on the electronic device and has a hidden position accommodated within the electronic device or a fastening position rotatably exposed from the electronic device. Besides, a shaft lever that can be extended into the guiding slot is disposed on one side of the fastener. When the activation button is located at the first or second position, the guide piece drives the fastener to move along the guiding slot, such that the fastener is located at the hidden or fastening position.

According to the above object, the present invention further discloses a hidden fastening structure for electronic devices, which comprises a first body, a second body, an actuator, and a fastener. The first body has a fastening slot, while the second body is pivotally connected to the first body. The actuator is movably disposed on the second body and comprises an activation button and a guide piece with a guiding slot. Under an external force, the activation button drives the guide piece and together move to a first position and a second position. Moreover, the fastener is rotatably disposed on the second body and has a hidden position accommodated within the second body or a fastening position rotatably exposed from the second body. Besides, a shaft lever that can be extended into the guiding slot is disposed on one side of the fastener. When the activation button is disposed at the first or second position, the guide piece drives the fastener to move along the guiding slot, such that the fastener is disposed at the hidden or fastening position.

The hidden fastening structure disclosed by the present invention not only can reduce the amount of the elements required in the prior art, thereby simplifying the structural configuration, but also convenient and simple to operate, and particularly, it is easy for a user to rotate the fastener by applying forces in the horizontal direction, so as to perform fastening and releasing operations. Moreover, the manufacturing process is simple, and thus the manufacturing cost is reduced.

The detailed features and advantages of the present invention are discussed below in detail through the following embodiments. It is easy for any skilled in the art to understand the technical content of the present invention and to implement accordingly. Furthermore, with reference to the content disclosed in the specification, claims, and drawings, the relevant objects and advantages of the present invention are apparent to those skilled in the art.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, which thus is not limitative of the present invention, and wherein.

DETAILED DESCRIPTION OF THE INVENTION

The hidden fastening structure disclosed by the present invention is applied to an electronic device, which can be, but not limited to, a tablet PC or a notebook, and any device that can be correspondingly closed or opened may utilize the technology disclosed in the present invention. A notebook is taken as an application embodiment in the following detailed description of the present invention.

Figure 1:
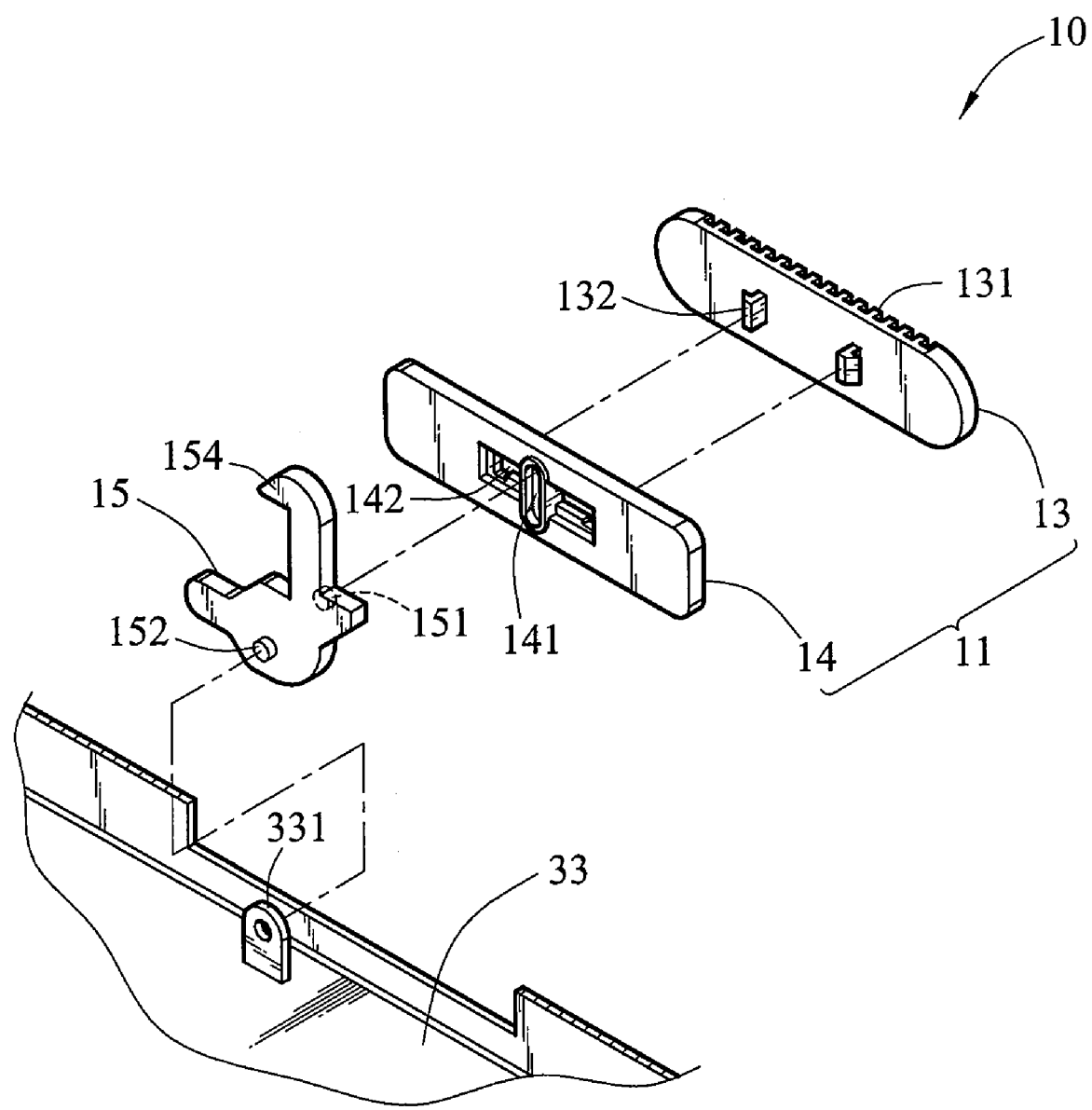
FIG. 1 is an exploded view of a structure of the present invention.

Please refer to FIG. 1 of an exploded view of a hidden fastening structure of the present invention. As shown in FIG. 1, a hidden fastening structure 10 comprises an actuator 11 and a fastener 15. The actuator 11 comprises an activation button 13 and a guide piece 14. The activation button 13 is provided with a key body 131 at one side, and a fastening part 132 at the other side. The guiding slot 141 is disposed at the guide piece 14, and a fastening hole 142 is disposed corresponding to the fastening part 132. A shaft lever 151 is disposed at one side of the fastener 15 which corresponds to the guiding slot 141, and a pivot shaft 152 is disposed at the other side. Besides, an inverted hook 154 is formed at one end of the fastener 15.

Figure 2:
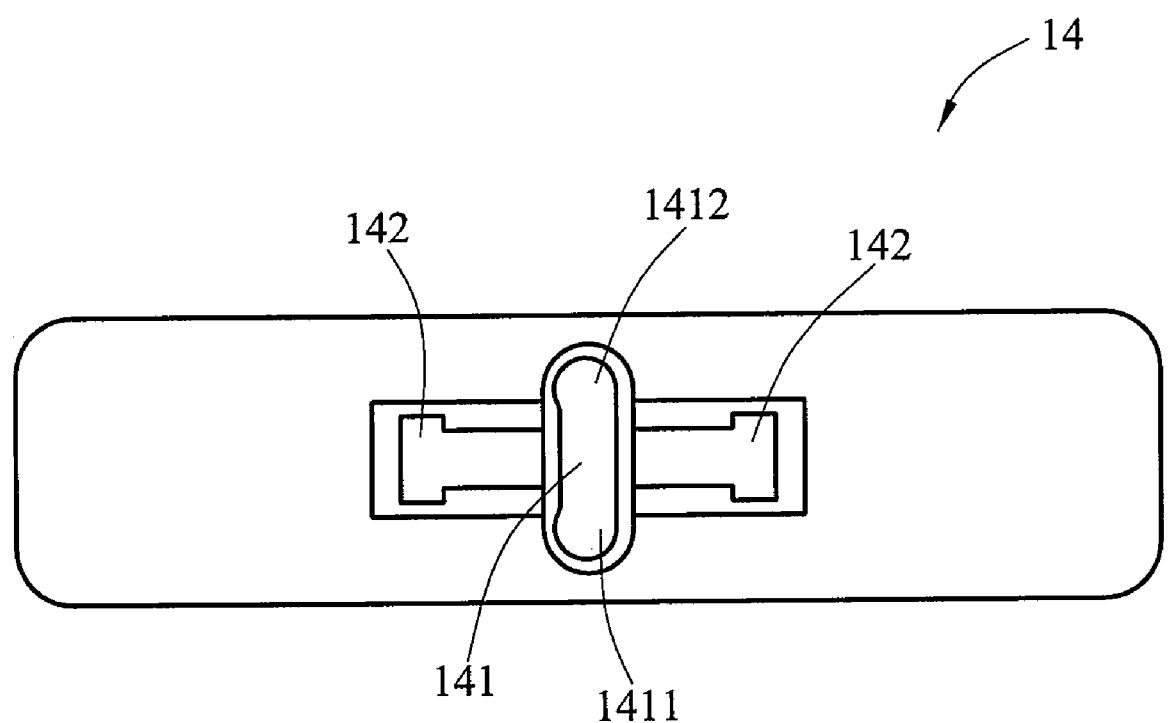
FIG. 2 is a schematic view of a structure of a guide piece according to the present invention.

Please refer to FIG. 2 of a schematic view of a guide piece according to the present invention. As shown in FIG. 2, the activation button 13 in the actuator 11 is embedded into the fastening hole 142 in the guide piece 14 via the fastening part 132. The fastening hole 142 is adjacent to the guiding slot 141. A first positioning hole 1411 and a second positioning hole 1412 are further disposed at two opposite ends of the guiding slot 141. The guiding slot 141 allows the shaft lever 151 of the fastener 15 to be extended.

Figure 3:
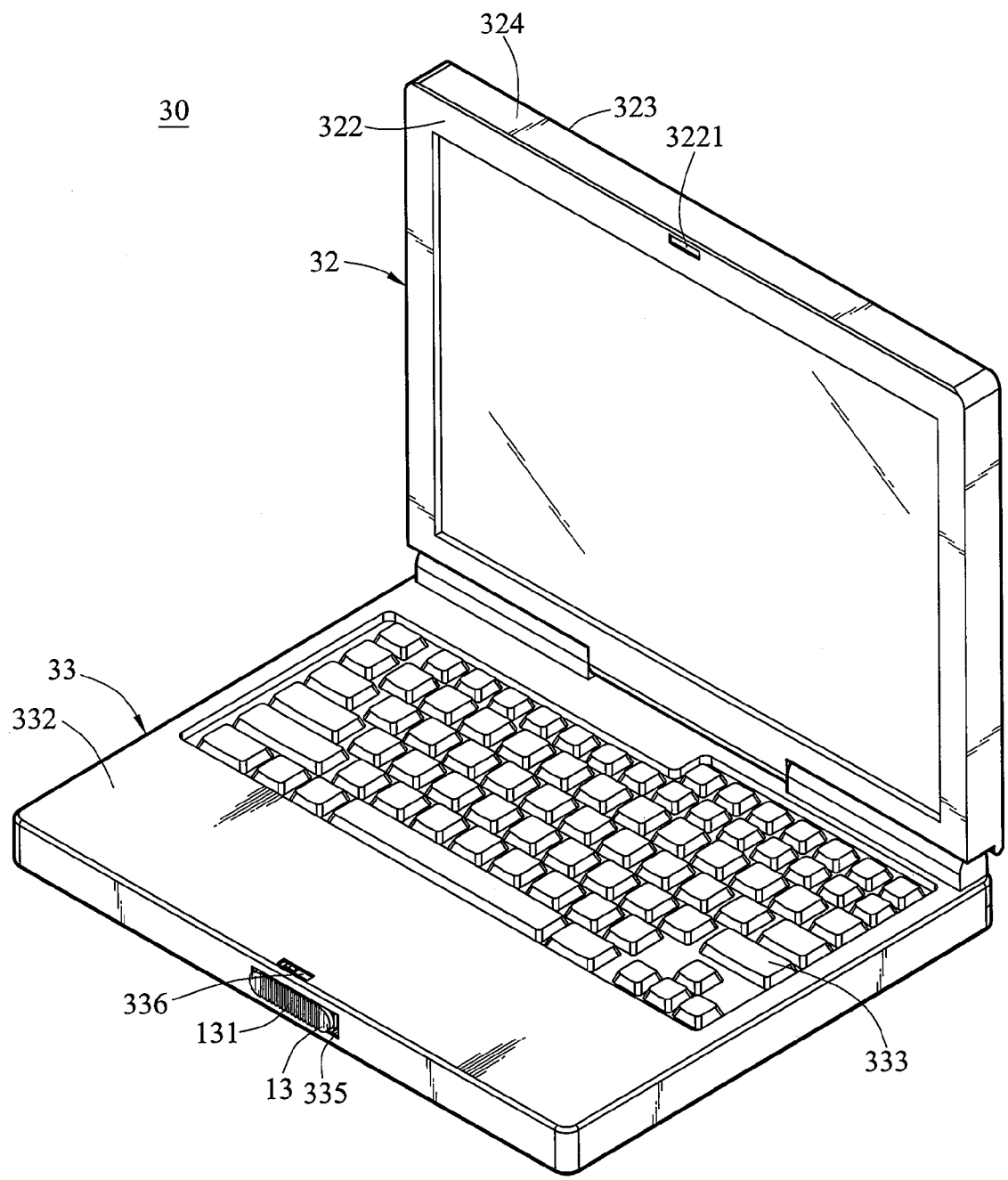
FIG. 3 is a schematic view of the appearance of a notebook.

Please refer to FIG. 3, it shows an operation status of a notebook 30. The notebook 30 has a first body 32 and a second body 33. The first body 32 is either a host or a display screen. Likewise, the second body 33 is either a display screen or a host corresponding to the first body 32. In the present invention, the first body 32 is a display screen and the second body 33 is a host. The first body 32 has a bottom wall 322, a top wall 323 corresponding to the bottom wall 322, and a side wall 324 disposed between the bottom wall 322 and the top wall 323. A fastening slot 3221 is formed in the bottom wall 322. The surface of the second body 33 has a panel 332 with a plurality of keys 333 accommodated therein, and a sliding slot 335 is correspondingly disposed on one side of the panel 332. An opening 336 is formed in the panel 332 corresponding to the fastening slot 3221. The activation button 13 protrudes from the sliding slot 335 via the key body 131. Moreover, the second body 33 is pivotally connected to the first body 32, such that the first body 32 and the second body 33 are correspondingly closed and opened. When the first body 32 is intended to cover the second body 33, the bottom wall 322 approaches and substantially contacts the panel 332 of the first body 32.

Figure 4A:
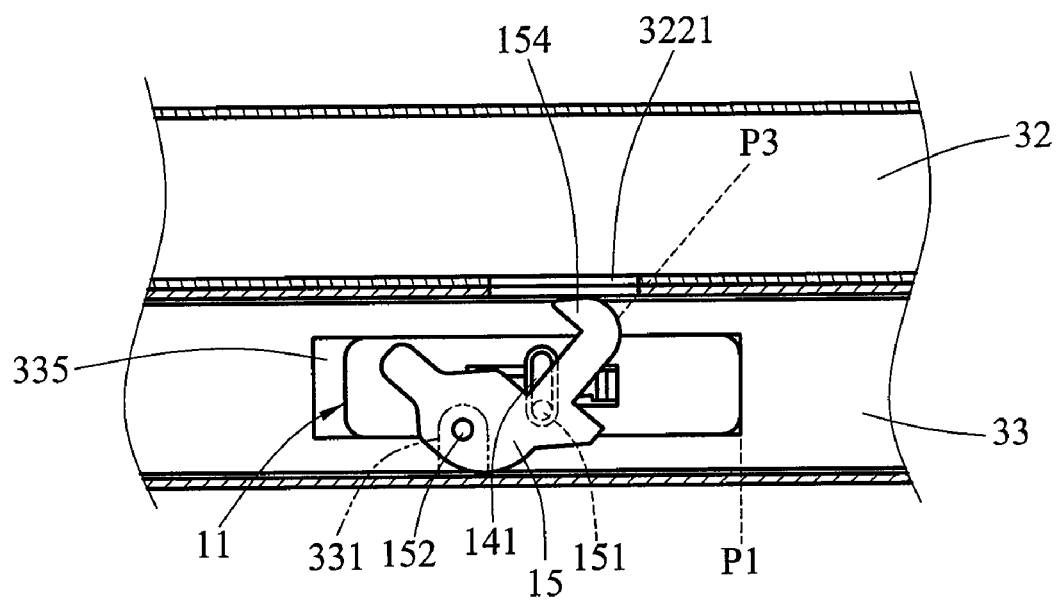
FIG. 4A is a schematic view of the using status when the present invention is applied to a notebook.
Figure 4B:
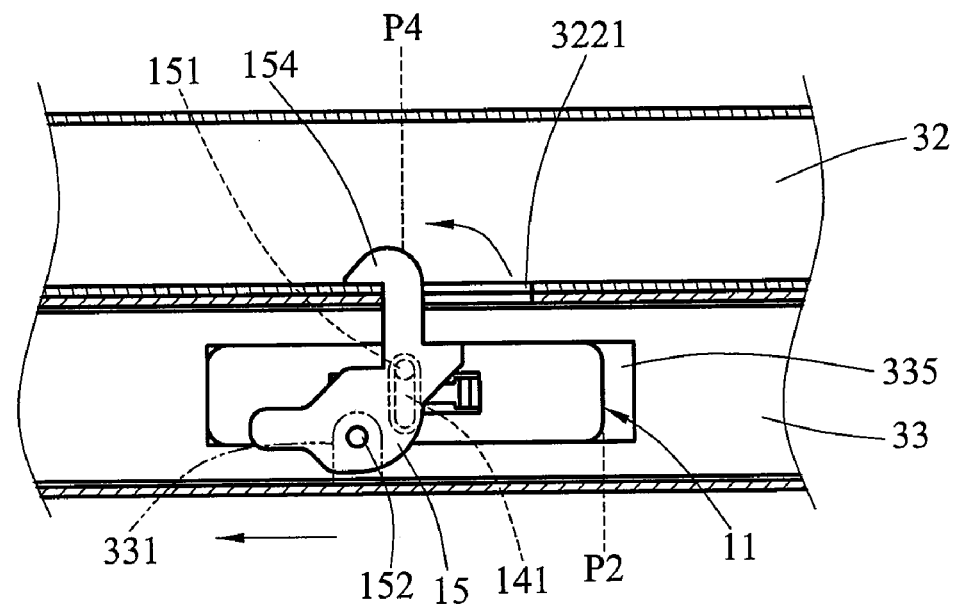
FIG. 4B is another schematic view of the using status when the present invention is applied to a notebook.

Please refer to FIGS. 1, 2, 3, 4A, and 4B, since the activation button 13 is movably disposed on the second body 33, and the activation button 13 is embedded in the fastening hole 142 via the fastening part 132, when being applied with an external force, the activation button 13 drives the guide piece 14 and together move to a first position P1 or a second position P2. The pivot shaft 152 on the other side of the fastener 15 is disposed on a fixing bracket 331 of the second body 33, such that the other side of the fastener 15 is pivotally connected to the fixing bracket 33-1, and thereby the fastener 15 rotates relative to the second body 33. When the activation button 13 moves along the sliding slot 335 from the first position P1 to the second position P2 under an external force, it simultaneously drives the guide piece 14 to move from the first position P1 to the second position P2, and the guide piece 14 further drives the fastener 15 to move along the guiding slot 141. The fastener 15 glides within the guiding slot 141 via the shaft lever 151, i.e., the shaft lever 151 glides from the first positioning hole 1411 to the second positioning hole 1412, as shown in FIG. 2. As such, the fastener 15 rotates relative to the second body 33 to protrude from the opening 336, i.e., moving from a hidden position P3 accommodated within the second body 33 to a fastening position P4 outside the second body 33, as shown in FIGS. 4A and 4B. Likewise, if the activation button 13 is intended to move from the second position P2 to the first position P1, the guide piece 14 drives the fastener 15 to move along the guiding slot 141. The fastener 15 glides within the guiding slot 141 via the shaft lever 151, i.e., the shaft lever 151 glides from the second positioning hole 1412 to the first positioning hole 1411, such that the fastener 15 rotates relative to the second body 33, i.e., moving from the fastening position P4 outside the second body 33 to the hidden position P3 accommodated within the second body 33.

When the first body 32 is intended to cover the second body 33, the bottom wall 322 approaches and substantially contacts the panel 332 of the first body 32. At this time, the activation button 13 located at the first position P1 is pushed, such that the shaft lever 151 of the fastener 15 is located at the second positioning hole 1412. The activation button 13 is located at the second position P2, and the fastener 15 is located at the fastening position P4, such that the fastener 15 is fastened to the fastening slot 3221 via the inverted hook 154. When the second body 33 is intended to rotate relative to the first body 32 to make the first body 32 be released from the second body 33, the activation button 13 at the second position P2 is pushed, such that the shaft lever 151 of the fastener 15 is positioned at the first positioning hole 1411. As such, the activation button 13 is located at the first position P1, the fastener 15 is located at the hidden position P3, such that the fastener 15 is removed from the fastening slot 3221 via the inverted hook 154 and then released from the fastening slot 3221.

Figure 5A:
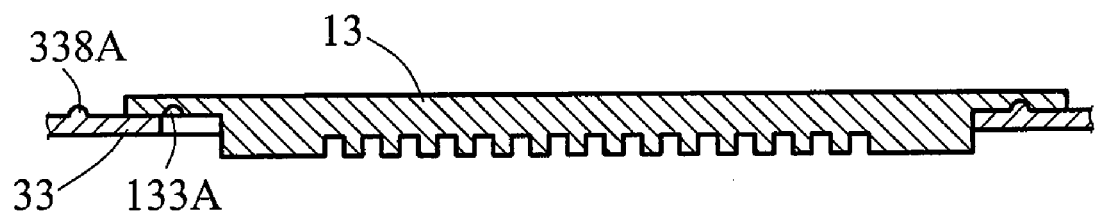
FIG. 5A is a schematic view of positioning an activation button according to the present invention.
Figure 5B:
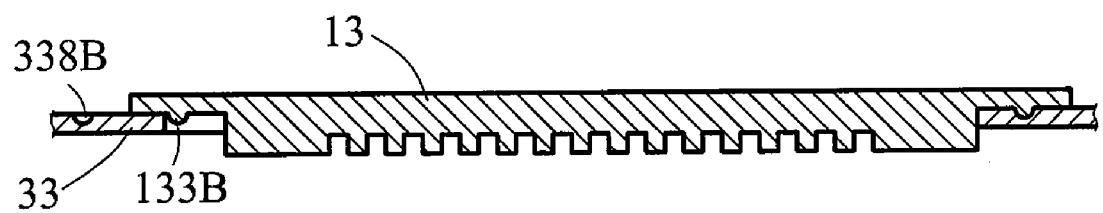
FIG. 5B is another schematic view of positioning the activation button according to the present invention.

Please refer to FIGS. 5A and 5B. FIG. 5A is a schematic view of positioning an activation button according to the present invention. FIG. 5B is another schematic view of positioning the activation button according to the present invention. As shown in FIG. 5A, the activation button 13 is further provided with a plurality of positioning slots 133A, and a positioning salient point 338A is disposed on the second body 33 corresponding to each of the positioning slots 133A. When the activation button 13 is pushed to perform the fastening operation, each of the positioning salient points 338A is sequentially embedded in each of the positioning slots 133A. As shown in FIG. 5B, the activation button 13 is further provided with a plurality of positioning salient points 133B, and positioning slots 338B are disposed on the second body 33 corresponding to each of the positioning salient points 133B. When the activation button 13 is pushed to perform the fastening operation, each of the positioning salient points 133B is sequentially embedded in each of the positioning slots 338B.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hidden fastening structure, applied to an electronic device, comprising:
   an actuator movably disposed on the electronic device and having an activation button and a guide piece, wherein the activation button has a fastening part, and the guide piece has a guiding slot and a fastening hole corresponding to the fastening part for being embedded with the fastening part, such that when the activation button is pushed by an external force, the activation button drives the guide piece and the activation button to move to a first position or a second position; and
   a fastener rotatably disposed on the electronic device having a hidden position accommodated within the electronic device or a fastening position rotatably exposed from the electronic device, wherein a shaft lever extending into the guiding slot is disposed at one side of the fastener, such that when the activation button is located at the first position or the second position, the guide piece drives the fastener to move along the guiding slot, such that the fastener is located at the hidden position or the fastening position.

2. The hidden fastening structure according to claim 1, wherein the electronic device comprises a sliding slot.

3. The hidden fastening structure according to claim 2, wherein the activation button further comprises a key body protruding from the sliding slot.

4. The hidden fastening structure according to claim 1, wherein a first positioning hole and a second positioning hole are further disposed at two opposite ends of the guiding slot, and when the activation button is located at the first position, the shaft lever glides along the guiding slot to be located at the first positioning hole, such that the fastener is located at the hidden position, whereas when the activation button is located at the second position, the shaft lever glides along the guiding slot to be located at the second positioning hole, such that said fastener is located at the fastening position.

5. The hidden fastening structure according to claim 1, wherein the other end of the fastener is pivotally connected to the electronic device.

6. The hidden fastening structure according to claim 1, wherein a plurality of positioning slots are disposed at the activation button, and positioning salient points are separately disposed on the electronic device corresponding to each of the positioning slots, when the activation button is moved to make the fastener rotate to be exposed from the electronic device, each of the positioning salient points is sequentially embedded into each of the positioning slots.

7. The hidden fastening structure according to claim 1, wherein a plurality of positioning slots are disposed on the electronic device, and positioning salient points are separately disposed on the activation button corresponding to each of the positioning slots, when the activation button is moved to make the fastener rotate to be exposed from the electronic device, each of the positioning salient points is sequentially embedded into each of the positioning slots.

8. The hidden fastening structure according to claim 1, wherein an inverted hook is formed at one end of the fastener.

9. A hidden fastening structure for an electronic device, comprising:
   a first body having at least one fastening slot;
   a second body pivotally connected to the first body;
   an actuator movably disposed on the second body and having an activation button and a guide piece, wherein the activation button has a fastening part, and the guide piece has a guiding slot and a fastening hole corresponding to the fastening part for being embedded with the fastening part, such that when the activation button is pushed by an external force, the activation button drives the guide piece and the activation button to move to a first position or a second position; and
   a fastener rotatably disposed on the second body, the fastener having a hidden position accommodated within the second body or a fastening position rotatably exposed from the second body, wherein a shaft lever extending into the guiding slot is disposed at one side of the fastener, such that when the activation button is located at the first position or the second position, the guide piece drives the fastener to move along the guiding slot, such that the fastener is located at the hidden position or the fastening position.

10. The hidden fastening structure for an electronic device according to claim 9, wherein the second body has a sliding slot.

11. The hidden fastening structure for an electronic device according to claim 10, wherein the activation button further comprises a key body protruding from the sliding slot.

12. The hidden fastening structure for an electronic device according to claim 9, wherein a first positioning hole and a second positioning hole are further disposed at two opposite ends of the guiding slot, and when the activation button is located at the first position, the shaft lever glides along the guiding slot to be located at the first positioning hole, such that the fastener is located at the hidden position, whereas when the activation button is located at the second position, the shaft lever glides along the guiding slot to be located at the second positioning hole, such that the fastener is located at the fastening position.

13. The hidden fastening structure for an electronic device according to claim 9, wherein when the second body approaches to the first body, the fastener is located at the fastening position, such that the fastener is fastened at the fastening slot, and when the fastener is located at the hidden position to be released from the fastening slot, the second body pivots relative to the first body.

14. The hidden fastening structure for an electronic device according to claim 9, wherein the other end of the fastener is pivotally connected to the second body.

15. The hidden fastening structure for an electronic device according to claim 9, wherein a plurality of positioning slots is disposed at the activation button, and positioning salient points are separately disposed on the second body corresponding to each of the positioning slots, when the activation button is moved to make the fastener rotate to be exposed from the second body, each of the positioning salient points is sequentially embedded into each of the positioning slots.

16. The hidden fastening structure for an electronic device according to claim 9, wherein a plurality of positioning slots is disposed on the second body, and positioning salient points are separately disposed on the activation button corresponding to each of the positioning slots, when the activation button is moved to make the fastener rotate to be exposed from the second body, each of the positioning salient points is sequentially embedded into each of the positioning slots.

17. The hidden fastening structure for an electronic device according to claim 9, wherein an inverted hook is formed at one end of the fastener, and the fastener is snapped at the fastening slot via the inverted hook.

* * * * *